US008294834B2

(12) United States Patent
Nishimura et al.

(10) Patent No.: US 8,294,834 B2
(45) Date of Patent: Oct. 23, 2012

(54) PROJECTION DISPLAY APPARATUS FOR FACILITATING REGISTRATION ADJUSTMENT OF COLORS OF A DISPLAY IMAGE

(75) Inventors: Koichiro Nishimura, Kanagawa (JP); Yoshitake Kondo, Kanagawa (JP)

(73) Assignee: Sony Corporation (JP)

( * ) Notice: Subject to any disclaimer, the term of this patent is extended or adjusted under 35 U.S.C. 154(b) by 866 days.

(21) Appl. No.: 12/220,298

(22) Filed: Jul. 23, 2008

(65) Prior Publication Data

US 2009/0027568 A1 Jan. 29, 2009

(30) Foreign Application Priority Data

Jul. 25, 2007 (JP) ................ P2007-193791

(51) Int. Cl.
*H04N 3/22* (2006.01)
*G03B 21/14* (2006.01)
(52) U.S. Cl. .......................... 348/745; 353/31
(58) Field of Classification Search .............. 348/745, 348/189, 383; 353/31, 69, 13; 345/690, 345/589
See application file for complete search history.

(56) References Cited

U.S. PATENT DOCUMENTS

| 6,377,859 B1 * | 4/2002 | Brown et al. ............ 700/79 |
| 6,982,744 B2 * | 1/2006 | Jenkins .................. 348/189 |
| 7,379,124 B2 * | 5/2008 | George et al. ........... 348/745 |
| 7,673,991 B2 * | 3/2010 | Van den Berg et al. .... 351/221 |
| 2002/0036752 A1 * | 3/2002 | Lin ...................... 353/31 |
| 2002/0060754 A1 * | 5/2002 | Takeuchi ................ 348/745 |
| 2003/0107710 A1 * | 6/2003 | Chiang .................. 353/31 |
| 2003/0123031 A1 * | 7/2003 | Nelson et al. ........... 353/31 |
| 2003/0197834 A1 * | 10/2003 | Kang ................... 353/31 |
| 2004/0027542 A1 * | 2/2004 | Kim .................... 353/31 |
| 2005/0088624 A1 * | 4/2005 | Lee et al. ............... 353/31 |

FOREIGN PATENT DOCUMENTS

| JP | 5-284444 A | 10/1993 |
| JP | 7-255059 A | 10/1995 |
| JP | 08-201937 A | 8/1996 |
| JP | 10-013850 A | 1/1998 |
| JP | 10-126799 A | 5/1998 |

* cited by examiner

*Primary Examiner* — Victor Kostak
(74) *Attorney, Agent, or Firm* — Lerner, David, Littenberg, Krumholz & Mentlik, LLP

(57) ABSTRACT

A projection display apparatus includes: a light source; a spatial light modulation device modulating, on the basis of a video signal, each of primary color lights for color display emitted from the light source; projecting means for projecting, onto a screen, each of the primary color lights modulated by the spatial light modulation device; and correcting means for correcting, based on a given correction value, the video signal for each of the primary color lights so as to reduce misregistration between the primary color lights projected on the screen, and supplying the corrected video signal to the spatial light modulation device. The correcting means is configured to correct the video signal according to a single correction value such that a group of correction target points selected in a projected image on the screen are collectively processed as a single correction unit.

7 Claims, 8 Drawing Sheets

PROJECTION DISPLAY APPARATUS FOR FACILITATING REGISTRATION ADJUSTMENT OF COLORS OF A DISPLAY IMAGE

CROSS-REFERENCE TO RELATED APPLICATIONS

The present application claims priority from Japanese Patent Application No. JP 2007-193791, filed in the Japanese Patent Office on Jul. 25, 2007, the entire content of which is incorporated herein by reference.

BACKGROUND OF THE INVENTION

1. Field of the Invention

The present invention relates to a projection display apparatus applied to a liquid crystal projector and the like.

2. Description of the Related Art

A projection display apparatus (for example, a liquid crystal projector) is being spread, which displays a picture by spatially modulating incident light on a spatial light modulation device in accordance with an electric signal applied to the spatial light modulation device, outputting the modulated light, and collecting and projecting the outgoing light. Such a projection display apparatus has generally a lamp as a light source, a condenser, and an illumination optical system for condensing light emitted from the lamp and the condenser and making the condensed light enter the spatial light modulation device. Light from the spatial light modulation device is projected by a projection lens onto a screen or the like.

Among such projection display apparatuses, in an apparatus for combining three primary color light of red light (R), green light (G), and blue light (B) and projecting the resultant light (so-called 3-modulation-panel projection display apparatus), variations may occur in the precision and the like in fixation of an optical system. In this case, there is an issue such that out-of-color-registration occurs due to misregistration between primary color lights in a display image projected on a screen. To reduce out-of-color-registration caused by optical-mechanism factors, a projection display apparatus having a registration adjusting function of electrically correcting the out-of-color-registration has been proposed (for example, Japanese Unexamined Patent Application Publication No. H08-201937).

SUMMARY OF THE INVENTION

The user performs such registration adjustment by entering an adjustment value to reduce misregistration in the horizontal direction (H direction) or the vertical direction (V direction) on each of the primary color light of red light, green light, and blue light at each of adjustment points on a screen while observing out-of-color registration on an image projected on a screen.

Since the out-of-color-registration on an image is caused by optical-mechanism factors as described above, there is the tendency that the directions and degrees of out-of-color-registration become similar to each other according to positions in the display screen. There is consequently a case such that the user wishes to adjust a plurality of adjustment points close to each other in a display screen by using the same adjustment value or the like. In a projection display apparatus of the related art, however, at the time of adjusting a plurality of adjustment points in a display screen, adjustment has to be performed on each of the adjustment points. It is, therefore, very complicated for the user to perform an input operation on the display screen. As a result, enormous time is necessary for the registration adjusting process as a whole, and the work efficiency is low.

It is therefore desirable to provide a projection display apparatus realizing improvement in work efficiency of the user at the time of registration adjustment.

According to an embodiment of the present invention, there is provided a projection display apparatus including: a light source; a spatial light modulation device modulating, on the basis of a video signal, each of primary color lights for color display emitted from the light source; projecting means for projecting, onto a screen, each of the primary color lights modulated by the spatial light modulation device; and correcting means for correcting, based on a given correction value, the video signal for each of the primary color lights so as to reduce misregistration between the primary color lights projected on the screen, and supplying the corrected video signal to the spatial light modulation device. The correcting means is configured to correct the video signal according to a single correction value such that a group of correction target points selected in a projected image on the screen are collectively processed as a single correction unit.

In the projection display apparatus of the embodiment of the present invention, light emitted from the light source is modulated by the spatial light modulation device on the basis of a video signal for each of the primary color lights, and the modulated primary color lights are projected onto the screen, thereby displaying a video image based on the video signal. The video signals for each of the primary color lights are corrected so as to reduce the misregistration between the primary color lights projected on the screen, and the corrected video signals are supplied to the spatial light modulation device. Thus, occurrence of out-of-color-registration caused by the misregistration between the primary color lights is suppressed, and the display quality improves. The correcting means is configured to correct the video signal according to a single correction value such that a group of correction target points selected in a projected image on the screen are collectively processed as a single correction unit. Therefore, as compared with the technique of the related art of correcting correction points one by one, time necessary for the registration adjusting process is shortened.

In the projection display apparatus of the embodiment of the present invention, the video signals for each of the primary color lights are corrected so as to reduce the misregistration between primary color lights projected on a screen (registration adjustment is performed). Therefore, occurrence of out-of-color-registration caused by the misregistration between the primary color lights is suppressed, and the display quality is improved. At the time of correcting video signals, using a plurality of correction points in a display screen as a single object to be corrected, the video signals can be corrected concurrently according to a single correction value. The correcting means is configured to correct the video signal according to a single correction value such that a group of correction target points selected in a projected image on the screen are collectively processed as a single correction unit. Therefore, as compared with the technique of the related art of correcting correction points one by one, time necessary for the registration adjusting process is shortened. Thus, the work efficiency of the user at the time of registration adjustment may be improved.

Other and further objects, features and advantages of the invention will appear more fully from the following description.

DETAILED DESCRIPTION OF THE PREFERRED EMBODIMENTS

Embodiments of the present invention will be described in detail hereinbelow with reference to the drawings.

Figure 1:
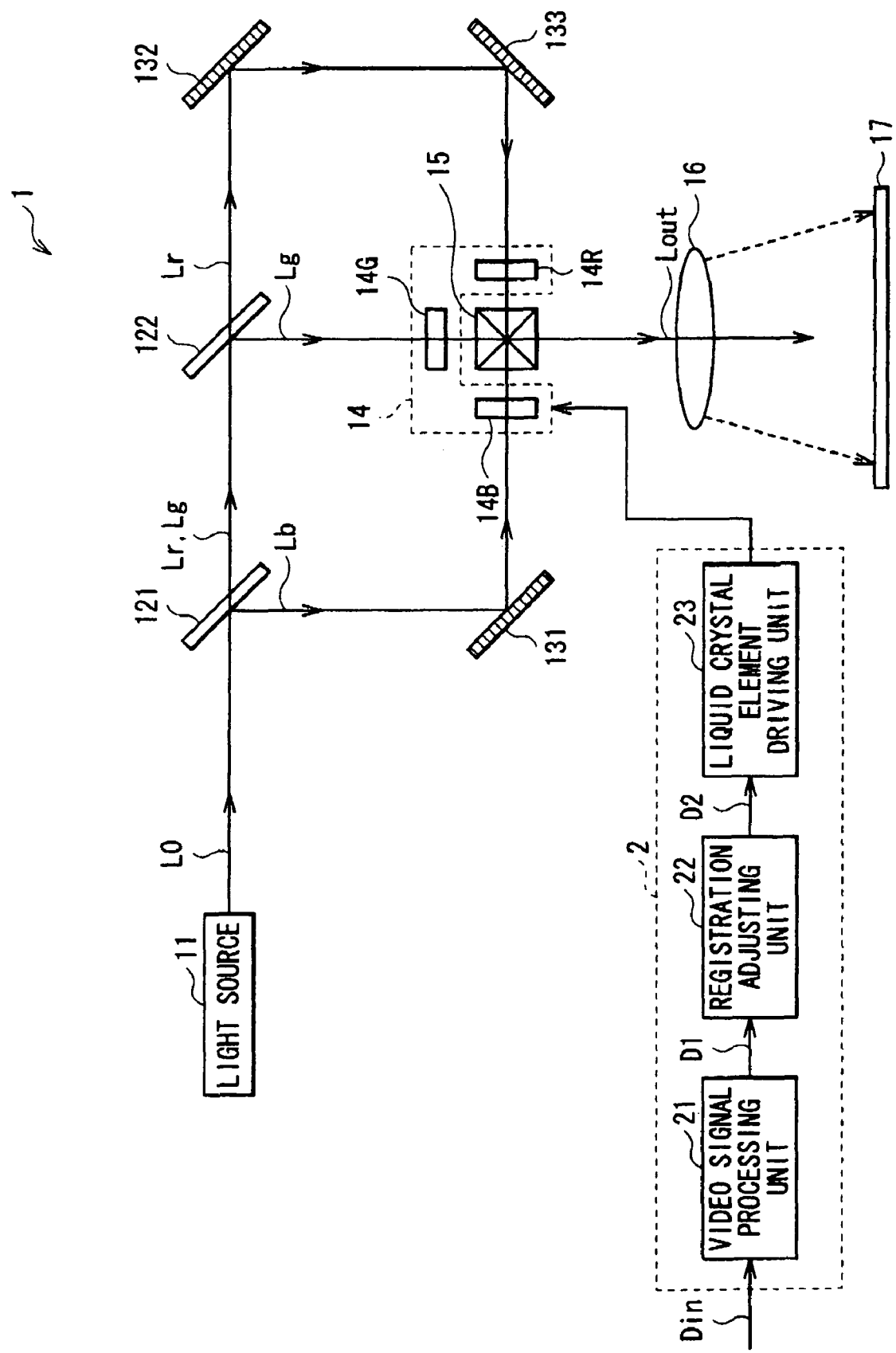
FIG. 1 is a block diagram showing the configuration of a projection display apparatus as an embodiment of the present invention.

FIG. 1 shows a general configuration of a projection display apparatus (liquid crystal projector 1) as an embodiment of the present invention. The liquid crystal projector 1 displays a video image on the basis of an input video signal Din supplied from the outside. The liquid crystal projector 1 includes a light source 11, dichroic mirrors 121 and 122, reflection mirrors 131, 132, and 133, a light modulator 14, a dichroic prism 15, a projection lens 16, a screen 17, and a control unit 2 for controlling the light modulator 14 on the basis of the input video signal Din.

The light source 11 generates white light including primary color light of red light (R), blue light (B), and green light (G) which is necessary to display a color image. The light source 11 is configured by, for example, a halogen lamp, a metal halide lamp, a xenon lamp, or the like.

The dichroic mirror 121 transmits red light Lr and green light Lg in irradiation light L0 generated from the light source 11 and reflects the blue light Lb, so that the red light Lr and the green light Lg travels while being separated from the blue light Lb. The dichroic mirror 122 transmits the red light Lr out of the red light Lr and the green light Lg passed through the dichroic mirror 121 and reflects the green light Lg, thereby making the red light Lr and the green light Lg travel while being separated from each other. The green light Lg reflected by the dichroic mirror 122 travels toward the light modulator 14.

The reflection mirror 131 reflects the blue light Lb reflected by the dichroic mirror 121 toward the light modulator 14. The reflection mirrors 132 and 133 reflect the red light Lr reflected by the dichroic mirror 122 toward the light modulator 14.

The light modulator 14 includes three liquid crystal elements 14R, 14G, and 14B corresponding to the primary color light of the red light Lr, the green light Lg, and the blue light Lb, respectively. The light modulator 14 modulates the irradiation light L0 generated from the light source 11 for each of the primary color lights (red light Lr, green light Lg, and blue light Lb) on the basis of video signals for the colors supplied from the control unit 2.

Concretely, the liquid crystal element 14R is disposed between the reflection mirror 133 and the dichroic prism 15 and modulates the incident red light Lr on the basis of the video signal for red supplied from the control unit 2. The liquid crystal element 14G is disposed between the dichroic mirror 122 and the dichroic prism 15 and modulates the incident green light Lg on the basis of the video signal for green supplied from the control unit 2. The liquid crystal element 14B is disposed between the reflection mirror 131 and the dichroic prism 15 and modulates the incident blue light Lb on the basis of the video signal for blue supplied from the control unit 2. Each of the liquid crystal elements 14R, 14G, and 14B has a structure in which, for example, a liquid crystal layer including liquid crystal molecules is sandwiched between a pair of substrates to which a drive voltage based on a video signal is applied.

The dichroic prism 15 mixes the red light Lr, green light Lg, and blue light Lb modulated by the liquid crystal elements 14R, 14G, and 14B, thereby obtaining mixture light (display light) Lout and makes the display light Lout travel along a single optical path (an optical path leading to the projection lens 16).

The projection lens 16 is disposed between the dichroic prism 15 and the screen 17 and projects the display light Lout generated by the dichroic prism 15 onto the screen 17. The screen 17 is a section to which light (display light Lout) modulated by the liquid crystal elements 14R, 14G, and 14B and projected by the projection lens 16 is projected.

The control unit 2 has a video signal processing unit 21, a registration adjusting unit 22, and a liquid crystal element driving unit 23.

The video signal processing unit 21 has the function of generating a video signal D1 (before-adjustment data D1) by performing white balance adjustment for adjusting color temperature of the input video signal Din and so-called gamma correction on the input video signal Din. By the function, adjustment to improve the quality of a display image is carried out.

When misregistration occurs between the primary color lights Lr, Lg, and Lb projected onto the screen 17, the registration adjusting unit 22 corrects the video signal D1 (before-adjustment data D1) for each of the colors corresponding to the primary color lights Lr, Lg, and Lb so as to reduce such misregistration in accordance with an adjustment value (correction value) entered by the user (registration adjustment). The registration adjusting unit 22 supplies the adjusted video signal D2 (adjusted data D2) for each of the colors to the liquid crystal element driving unit 23. The details of the adjusting process performed by the registration adjusting unit 22 will be described later.

The liquid crystal element driving unit 23 drives each of the liquid crystal elements 14R, 14B, and 14G on the basis of the adjusted data D2 supplied from the registration adjusting unit 22.

Each of the liquid crystal elements 14R, 14B, and 14G corresponds to a concrete example of "spatial light modulation device" in the present invention, and the projection lens 16 corresponds to a concrete example of "projecting means" in the present invention. The registration adjusting unit 22 corresponds to a concrete example of "correcting means" in the present invention.

Figure 2:
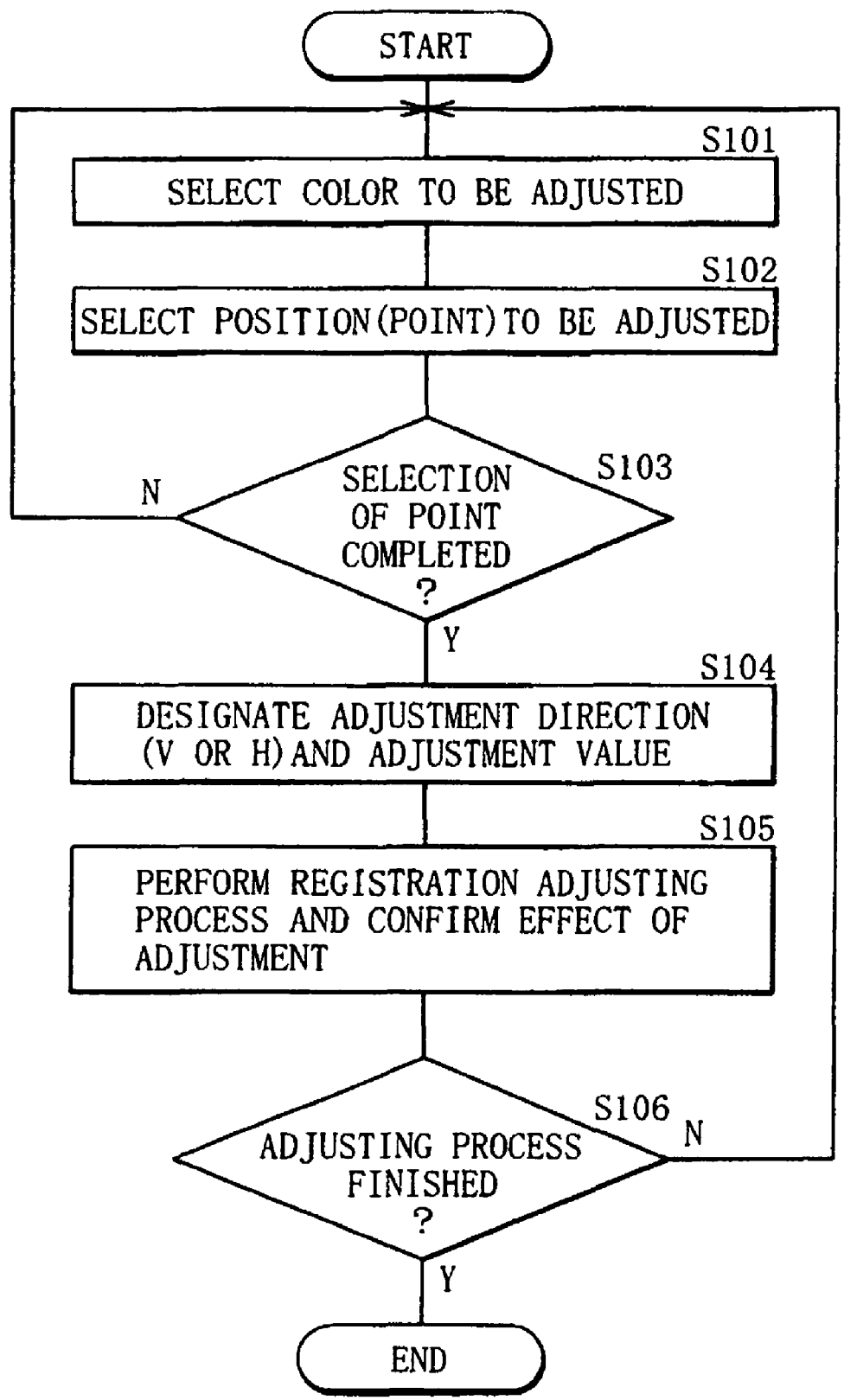
FIG. 2 is a flowchart showing an example of an adjusting process performed by a registration adjusting unit in the embodiment.
Figures 8A, 8B, 8C:
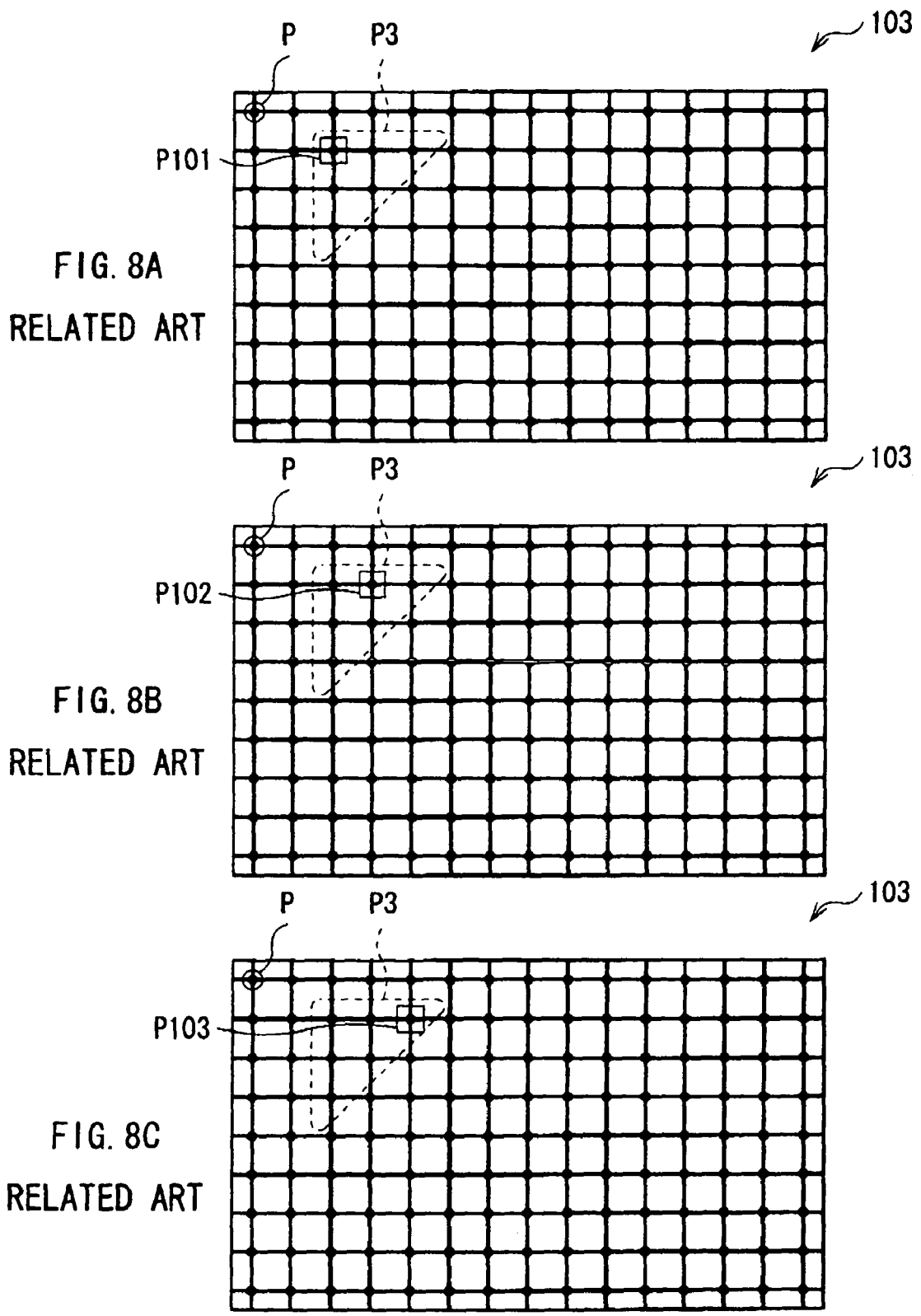
FIGS. 8A, 8B, and 8C are diagrams for explaining registration adjustment in a comparative example in the case of FIG. 7.

Referring now to FIGS. 1 to 9, the operation of the liquid crystal projector 1 of the embodiment will be described in detail. FIG. 2 is a flowchart showing an example of the adjusting process performed by the registration adjusting unit 22. FIGS. 3 to 9 show an example of a display screen on the screen 17 at the time of the adjusting process in comparison with the technique of the related art in the comparative example (FIG. 8).

In the liquid crystal projector 1, as shown in FIG. 1, the irradiation light L0 generated from the light source 11 is split by the dichroic mirror 121 to the red light Lr and the green light Lg, and the blue light Lb. The red light Lr and the green light Lg is separated from each other by the dichroic mirror 122. The split red light Lr enters the liquid crystal element 14R via the reflection mirrors 132 and 133, the split green light Lg directly enters the liquid crystal element 14G, and the split blue light Lb enters the liquid crystal element 14B via the reflection mirror 131. The primary color lights Lr, Lg, and Lb are modulated on the basis of the video signals for the colors supplied from the control unit 2 in the liquid crystal elements 14R, 14G, and 14B, respectively. The modulated primary color lights Lr, Lg, and Lb are mixed with each other by the dichroic prism 15 and becomes the display light Lout. The display light Lout is projected by the projection lens 16 onto the screen 17, and a video image is displayed on the basis of the input video signal Din.

In the control unit 2, first, white balance adjustment and gamma correction is performed on the input video signal Din in the video signal processing unit 21, thereby generating the video signal D1. In the registration adjusting unit 22, for example, as shown in FIG. 2, correction (registration adjustment) is performed on the video signal D1 (before-adjustment data D1) supplied from the video signal processing unit 21 in accordance with a correction value entered from the user. The corrected video signal D2 (adjusted data D2) is supplied to the liquid crystal element driving unit 23.

Figure 3:
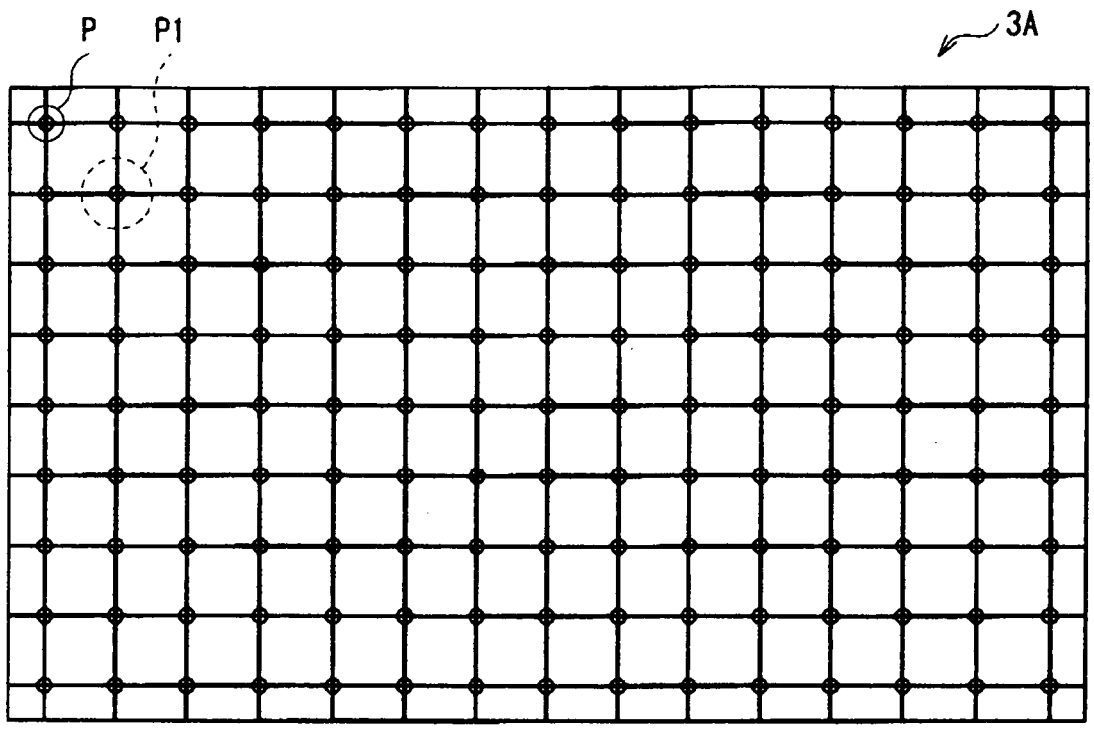
FIG. 3 is a diagram showing an example of a display screen before the registration adjustment is performed.
Figure 4:
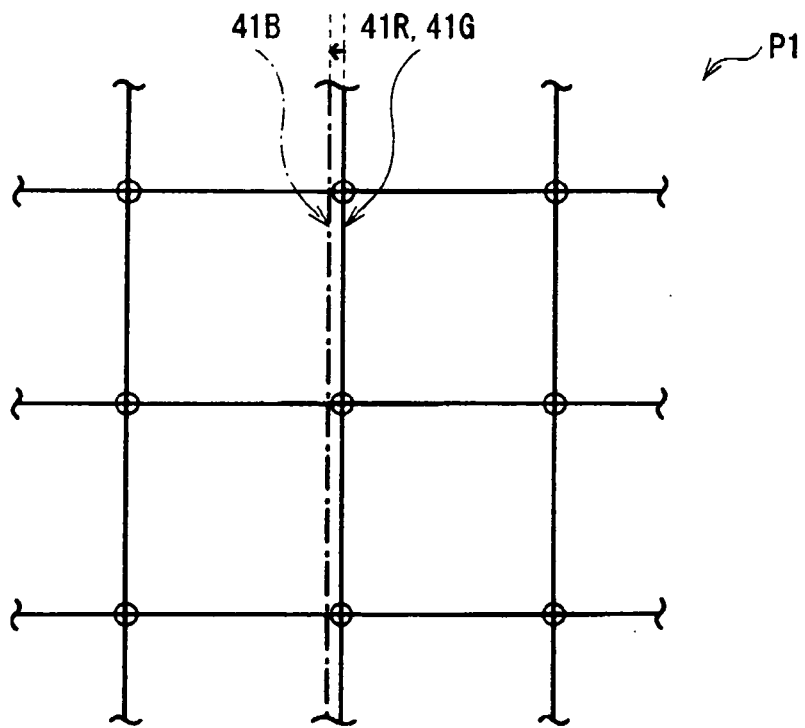
FIG. 4 is an enlarged diagram showing an example of the display screen in the case where misregistration in the horizontal direction occurs in specific primary color light.
Figure 5:
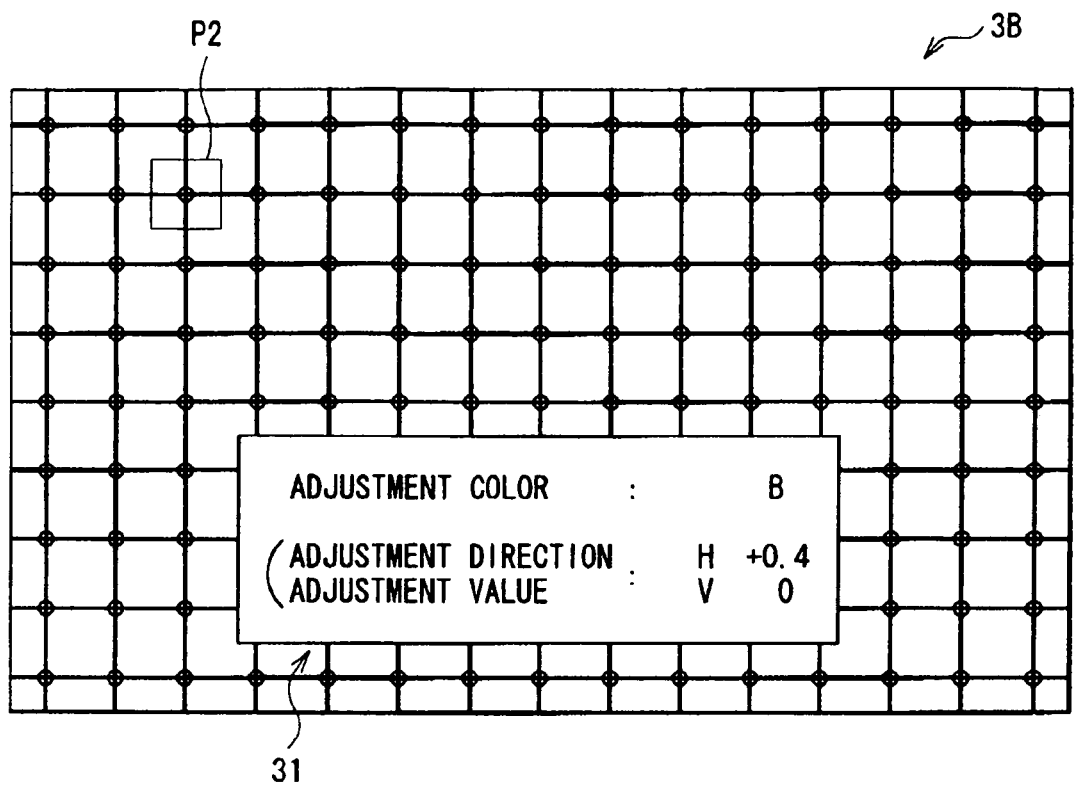
FIG. 5 is a diagram showing an example of the display screen at the time of registration adjustment in the horizontal direction.
Figure 6:
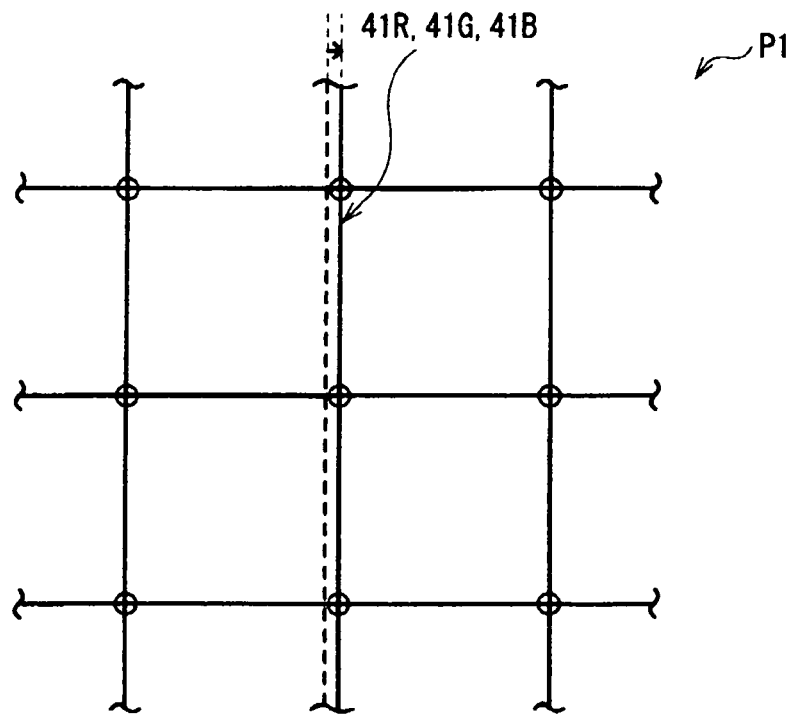
FIG. 6 is an enlarged diagram of the display screen after the registration adjustment is performed in the example of the display screen shown in FIG. 4.
Figure 7:
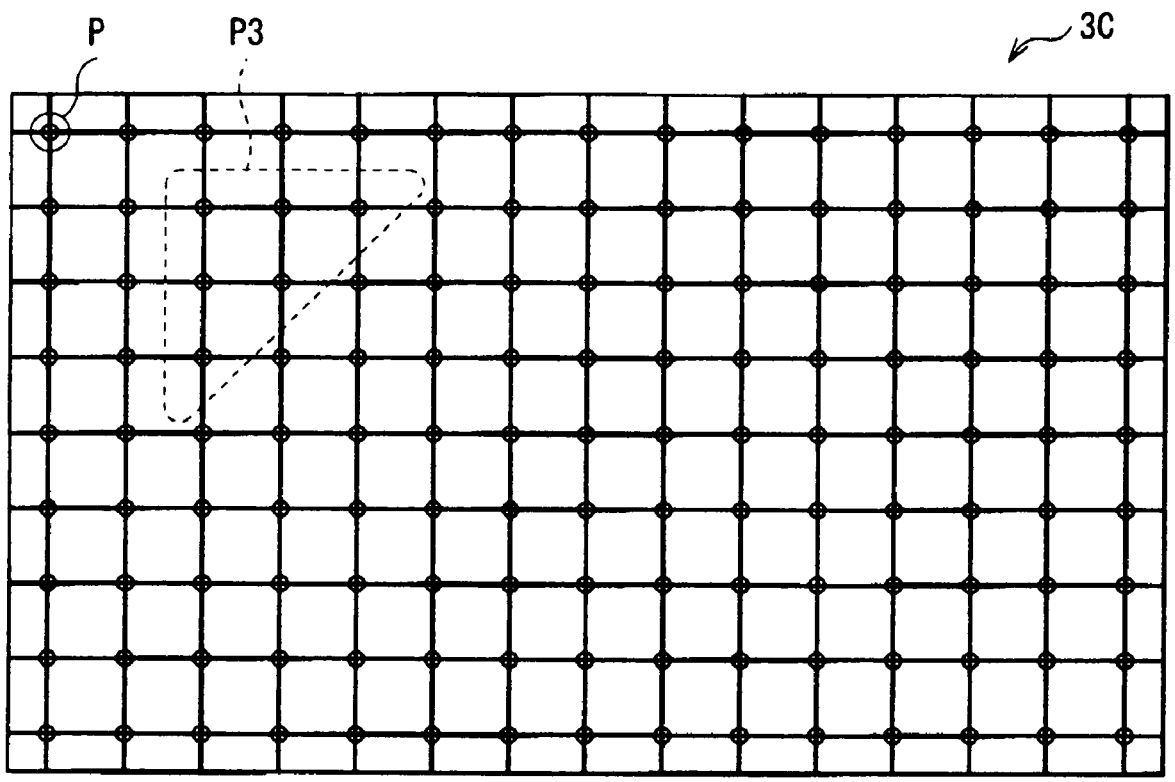
FIG. 7 is a diagram showing an example of a display screen in the case where misregistration of specific primary color light occurs in a display area including a plurality of adjustment points.

Concretely, in the case where a plurality of adjustment points P for registration adjustment are displayed on a display screen 3A shown in FIG. 3, if out-of-color-registration as shown in FIG. 4 (out-of-color-registration caused by misregistration only by, for example, "−0.4 point (0.4 point to the left)" in the horizontal direction (H direction) of a blue light line 41B in a red light line 41R, a green light line 41G, and a blue light line 41B) occurs around reference numeral P1, the registration adjustment is performed as follows. Specifically, first, a color to be adjusted (in this case, blue (B)) is selected by the user (step S101 in FIG. 2) on an adjustment menu 31 on a display screen 3B as shown in FIG. 5. A position (point) to be adjusted is selected similarly on the display screen 3B (in this case, an adjustment point near the reference numeral P1 is selected as a selected point P2) (step S102). The registration adjusting unit 22 determines whether such a point selecting process has been completed or not (step S103). In the case where the user replies that the process has not been completed (N in step S103), the program returns to the step S102 and repeats the point selecting process again. On the other hand, when the user replies that the process has been completed (Y in step S103), the program advances to step S104. That is, on the adjustment menu 31, the adjustment direction (the horizontal direction (H direction) or the vertical direction (V), in this case, the horizontal direction) and the adjustment value (in this case, "+0.4" point (0.4 point to the right)) are set by the user (step S104). Next, an actual registration adjusting process is performed on the basis of the selected/designated data, and an adjustment effect recognizing process on the display screen is performed by the user (step S105). Whether the entire adjusting process is finished or not is determined by the registration adjusting unit 22 (step S106). In the case where the user instructs not to finish the entire adjusting process yet (N in step S106), the program returns to the step S101 and repeats the processes in the steps S101 to S105. On the other hand, for example, as shown in FIG. 6, in the case where the out-of-color-registration caused by the misregistration in the horizontal direction of the blue light line 41B is reduced (eliminated), an instruction of finishing the entire adjusting process is given by the user (Y in step S106), and the entire adjusting process is finished.

As described above, in the registration adjusting unit 22, in the case where the misregistration occurs between the primary color lights Lr, Lg, and Lb projected on the screen 17, the video signals D1 for the colors corresponding to the primary color lights Lr, Lg, and Lb are corrected (registration adjustment is performed) so as to reduce the misregistration in accordance with the adjustment value or the like entered by the user. The corrected video signals D2 are supplied to the liquid crystal elements 14R, 14G, and 14B. As a result, occurrence of the out-of-color-registration caused by the misregistration between the primary color lights Lr, Lg, and Lb is suppressed, and display quality improves.

Since the out-of-color-registration on an image is caused by optical-mechanism factors as described above, there is the tendency that the directions and degrees of out-of-color-registration become similar to each other according to positions in the display screen. Consequently, when misregistration occurs at a plurality of adjustment points P close to each other in a display screen 3C, for example, as in a misregistration area P3 shown in FIG. 7, the user wishes to adjust the plurality of adjustment points P in the misregistration area P3 by using the same adjustment value or the like. In a comparative example shown in FIGS. 8A to 8C, at the time of performing registration adjustment on a plurality of adjustment points P in a misregistration area P3 on a display screen 103, each of adjustment points P101, P102, P103, and so on is selected as an object to be corrected and is adjusted. It is, therefore, very complicated for the user to perform an input operation on the display screen 103. As a result, enormous time is required for the registration adjusting process as a whole, and the work efficiency is low.

Figure 9:
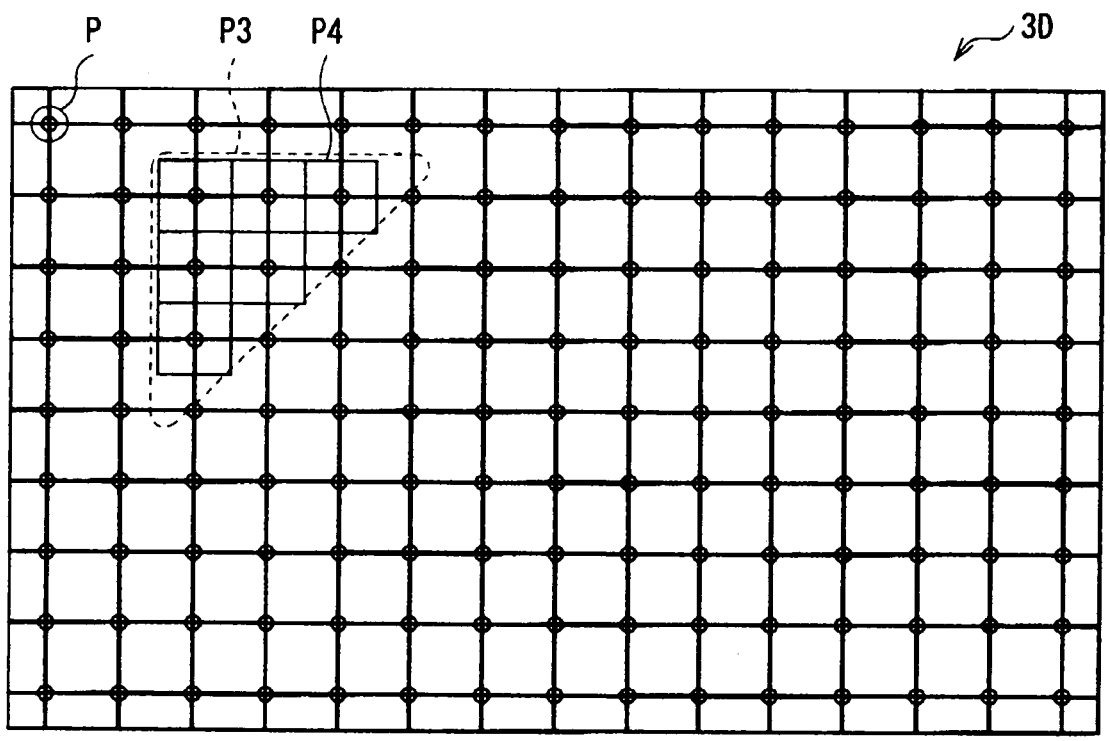
FIG. 9 is a diagram for explaining registration adjustment in the embodiment in the case of FIG. 7.

In the liquid crystal projector 1 of the embodiment, for example, as shown in FIG. 9, at the time of performing registration adjustment on a plurality of adjustment points P in the misregistration area P3 on a display screen 3D, the plurality of correction points P are selected as a single object to be corrected (selected point P4). For example, the coordinates of each of the adjustment points P are recorded in a not-shown memory in the registration adjusting unit 22, so that correction of the video signal D1 can be performed concurrently according to a single adjustment value or the like (refer to steps S102 and S103 in FIG. 2). Therefore, time necessary for the registration adjusting process becomes shorter than that in the case of selecting each of the adjustment points P101 to P103 and performing adjustment so on as in the technique of the related art (comparative example FIGS. 8A to 8C).

In the embodiment as described above, when misregistration occurs in at least one of the horizontal and vertical directions in the display screen between the primary color lights Lr, Lg, and Lb projected on the screen 17, the video signals D1 for the colors corresponding to the primary color lights Lr, Lg, and Lb are corrected (registration adjustment is performed) so as to reduce the misregistration in accordance with the adjustment value or the like entered by the user. Therefore, occurrence of the out-of-color-registration due to the misregistration between the primary color lights Lr, Lg, and Lb is suppressed, and display quality is improved. In addition, at the time of correcting the video signal D1, a plurality of adjustment points P in the display screen 3C are selected as a single object to be adjusted (selected point P4), and the video signals D1 is able to be corrected (registration adjustment is performed) concurrently in accordance with the single adjustment value and the like. Consequently, as compared with the case where adjustment is performed on each of the adjustment points P as in the 1 technique of the related art (comparative example shown in FIGS. 8A to 8C), the time necessary for the registration adjusting process is able to be shortened. Therefore, the work efficiency of the user at the time of registration adjustment may be improved.

By an operation on the display screens 3A to 3C projected onto the screen 17, objects to be adjusted in the plurality of adjustment points P4 is able to be selected. Therefore, the user may easily perform the adjustment point selecting operation.

Although the present invention has been described by the embodiment, the invention is not limited to the embodiment but may be variously modified.

Figure 10:
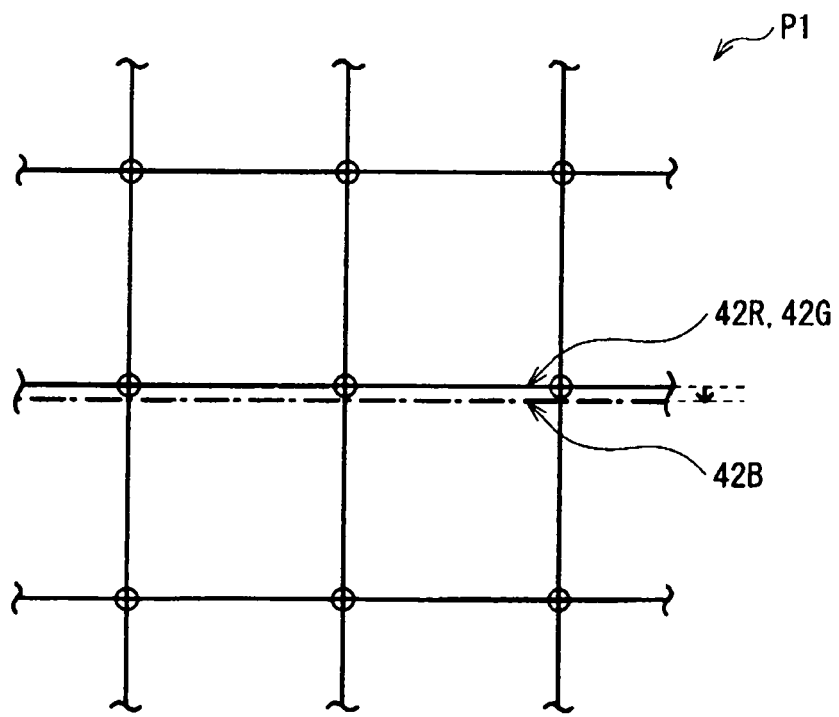
FIG. 10 is an enlarged diagram showing an example of a display screen in the case where misregistration in the vertical direction occurs in specific primary color light.
Figure 11:
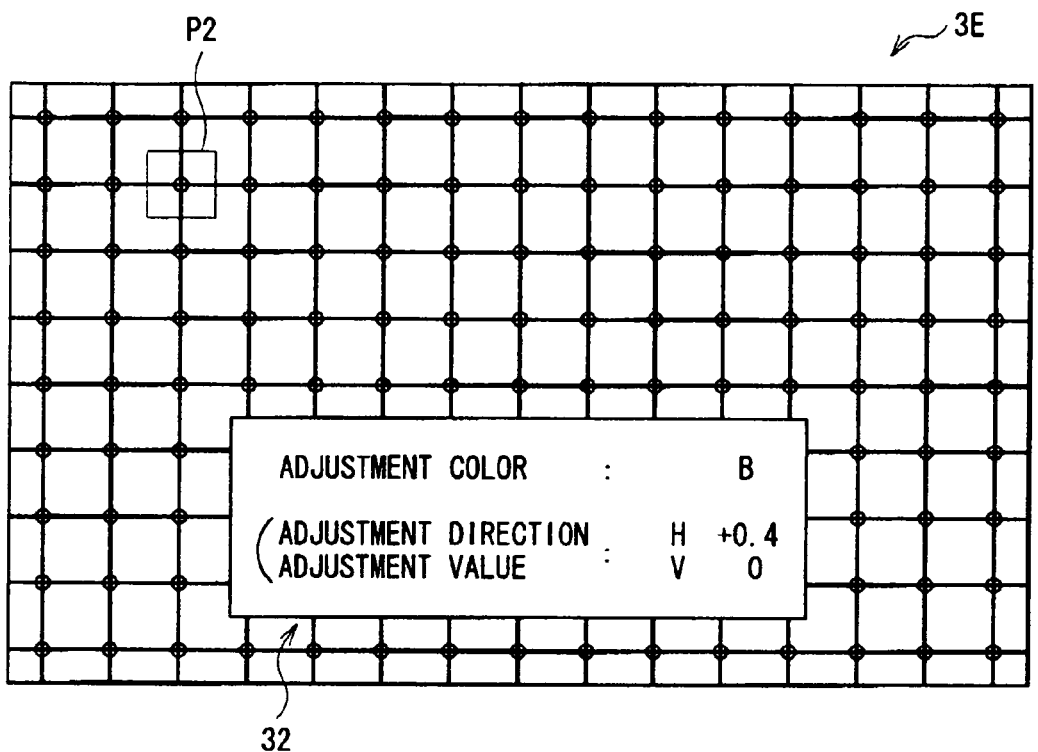
FIG. 11 is a diagram showing an example of a display screen at the time of registration adjustment in the vertical direction.
Figure 12:
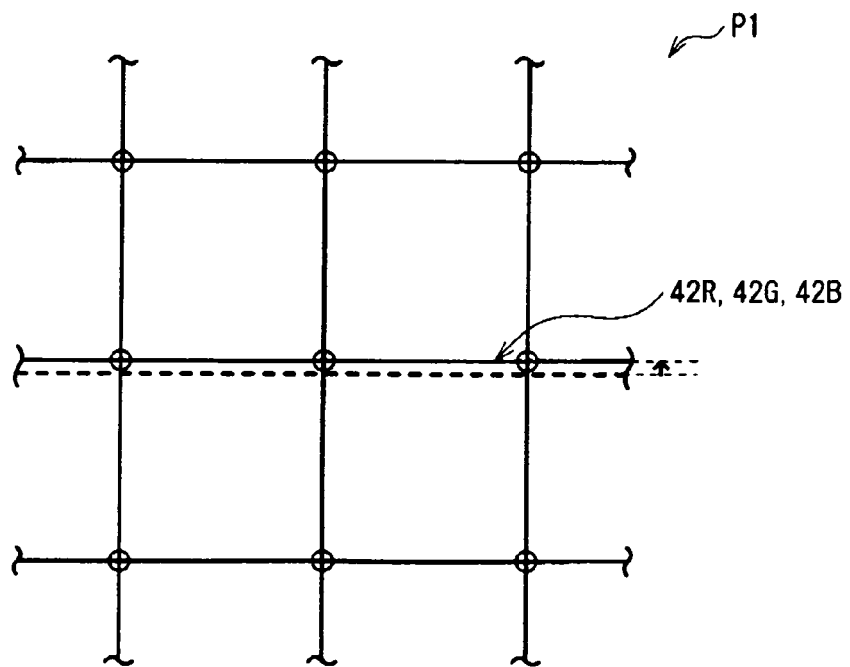
FIG. 12 is an enlarged diagram showing a display screen after the registration adjustment is performed in the example of the display screen illustrated in FIG. 10.

In the foregoing embodiment, the registration adjustment in the horizontal direction for reducing (eliminating) misregistration in the horizontal direction (H direction) has been described. For example, in the red light line 42R, the green light line 42G, and the blue light line 42B shown in FIG. 10, also in the case where misregistration (in this case, misregistration in the "−" direction) occurs in the vertical direction (V direction) in the blue light line 42B, in a manner similar to the foregoing embodiment, by performing the registration adjustment in the vertical direction using an adjustment menu 32 and a selected point P2 on a display screen 3E shown in FIG. 11, misregistration in the vertical direction in the blue light line 42B is reduced (eliminated) and out-of-color-registration is suppressed as shown in FIG. 12. As a result, the display quality is improved.

In the foregoing embodiment, the case of performing the registration adjustment in the "+" direction in order to reduce (eliminate) the misregistration in the "−" direction has been described. On the contrary, registration adjustment in the "−" direction for reducing (eliminating) the misregistration in the "+" direction may be performed in a manner similar to the embodiment, and similar effects may be obtained.

In the foregoing embodiment, the case of selecting a color to be adjusted by the user and, after that, selecting a position to be adjusted (adjustment point) at the time of registration adjustment as shown in FIG. 2 has been described. For example, in the opposite order, it is also possible to select a position to be adjusted (adjustment point) and, then, select a color to be adjusted.

Although the so-called three-chip projection display apparatus (projector) has been described in the embodiment, the type of the projection display apparatus is not limited to the above. The invention is also applicable to projection display apparatuses of other types as long as there is the possibility that misregistration occurs between primary color lights projected on a screen.

Further, in the embodiment, the case where the spatial light modulation devices are liquid crystal elements (the liquid crystal elements 14R, 14G, and 14B) and are configured as a liquid crystal apparatus (liquid crystal projector 1) has been described. As another spatial light modulation device, for example, a DMD (Digital Micromirror Device) may be used.

It should be understood by those skilled in the art that various modifications, combinations, sub-combinations and alternations may occur depending on design requirements and other factors insofar as they are within the scope of the appended claims or the equivalents thereof.

What is claimed is:

1. A projection display apparatus, comprising:
   a light source;
   separating means for separating light generated by the light source into primary color lights;
   mixing means;
   a spatial light modulation device disposed between the separating means and the mixing means for modulating, based on a video signal, each of the primary color lights for color display emitted from the light source;
   the mixing means mixing each of the primary color lights modulated by the spatial light modulation device;
   projecting means for projecting, onto a screen, the mixed primary color lights; and
   correcting means for correcting, based on a given correction value, the video signal for each of the primary color lights to reduce misregistration between the primary color lights projected on the screen, and for supplying the corrected video signal to the spatial light modulation device,
   wherein the correcting means corrects the video signal such that a group of correction target points selected in a projected image on the screen are collectively processed as a single correction unit with use of a single correction value, and
   wherein the correcting means white balance adjusts and gamma corrects the video signal for each of the primary color lights and then corrects, based on the given correction value, the white balance adjusted and gamma corrected video signal for each of the primary color lights to reduce misregistration between the primary color lights projected on the screen.

2. The projection display apparatus according to claim 1, wherein the spatial light modulation device includes liquid crystal elements, and the projection display apparatus is a liquid crystal projector.

3. The projection display apparatus according to claim 1, wherein one target point in the group of correction target points is selected as a selected target point for use in obtaining the single correction value.

4. The projection display apparatus according to claim 1, wherein selection of the group of correction target points is performed through a user operation upon the projected image on the screen.

5. A projection display apparatus, comprising:
   a light source;
   a separating section separating light generated by the light source into primary color lights;
   a mixing section;
   a spatial light modulation device disposed between the separating section and the mixing section and modulating, based on a video signal, each of the primary color lights for color display emitted from the light source;
   the mixing section mixing each of the primary color lights modulated by the spatial light modulation device;

projecting section projecting, onto a screen, the mixed primary color lights; and correcting section correcting, based on a given correction value, the video signal for each of the primary color lights to reduce misregistration between the primary color lights projected on the screen, and supplying the corrected video signal to the spatial light modulation device, wherein the correcting section corrects the video signal such that a group of correction target points selected in a projected image on the screen are collectively processed as a single correction unit with use of a single correction value, and wherein the correcting section white balance adjusts and gamma corrects the video signal for each of the primary color lights and then corrects, based on the given correction value, the white balance adjusted and gamma corrected video signal for each of the primary color lights to reduce misregistration between the primary color lights projected on the screen.

6. The projection display apparatus according to claim 5, wherein one target point in the group of correction target points is selected as a selected target point for use in obtaining the single correction value.

7. The projection display apparatus according to claim 5, wherein selection of the group of correction target points is performed through a user operation upon the projected image on the screen.

* * * * *